United States Patent [19]

Newton et al.

[11] Patent Number: 5,072,695
[45] Date of Patent: Dec. 17, 1991

[54] AUTOMATIC FISH FEEDER

[76] Inventors: Maurice M. Newton, 1321 Laurel Cres, Norfolk, Va. 23505; George Spector, 233 Broadway, New York City, N.Y. 10007

[21] Appl. No.: 526,642

[22] Filed: May 21, 1990

[51] Int. Cl.⁵ .............................................. A01K 5/00
[52] U.S. Cl. .................................... 119/51.04; 119/5
[58] Field of Search ...................... 119/51.04, 51.11, 5

[56] References Cited

U.S. PATENT DOCUMENTS

| | | | |
|---|---|---|---|
| 2,785,831 | 3/1957 | Swolin | 119/51.04 |
| 3,029,790 | 4/1962 | Lowdou | 119/51.04 |

FOREIGN PATENT DOCUMENTS

| | | | |
|---|---|---|---|
| 673806 | 11/1963 | Canada | 119/51.04 |
| 135342 | 5/1979 | Fed. Rep. of Germany | 119/51.04 |
| 593605 | 6/1976 | Switzerland | 119/51.04 |
| 688159 | 9/1979 | U.S.S.R. | 119/51.04 |

*Primary Examiner*—John G. Weiss

[57] ABSTRACT

An automatic fish feeder is provided and consists of an open top container for receiving fish food which is carried on a top support surface of a housing that is removably coupled to a fish tank light fixture. A sprocket in the housing extends into the bottom of the container and is coupled to a shaft of an electric motor. As electric circuitry operates the electric motor at specific timed intervals to rotate the sprocket to deposit the fish food into the fish tank to feed the fish.

1 Claim, 1 Drawing Sheet

AUTOMATIC FISH FEEDER

BACKGROUND OF THE INVENTION

The instant invention relates generally to food dispensers and more specifically it relates to an automatic fish feeder which provides a controlled feeding schedule for fish.

There are available various conventional food dispensers which do not provide the novel improvements of the invention herein disclosed.

SUMMARY OF THE INVENTION

A primary object of the present invention is to provide an automatic fish feeder that will overcome the shortcomings of the prior art devices.

Another object is to provide an automatic fish feeder which dispenses food to fish for people who do not want to be bothered or cannot be at home to feed fish.

An additional object is to provide an automatic fish feeder that can control the amount of food needed to feed fish on a timed schedule.

A further object is to provide an automatic fish feeder that is simple and easy to use.

A still further object is to provide an automatic fish feeder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
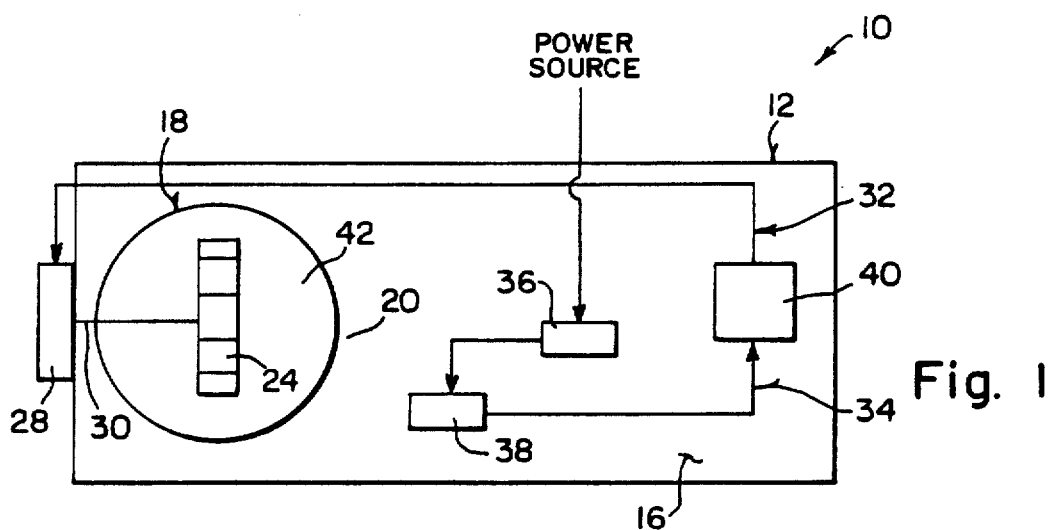
FIG. 1 is a diagrammatic top view of the invention showing the electric circuit thereof.
Figure 2:
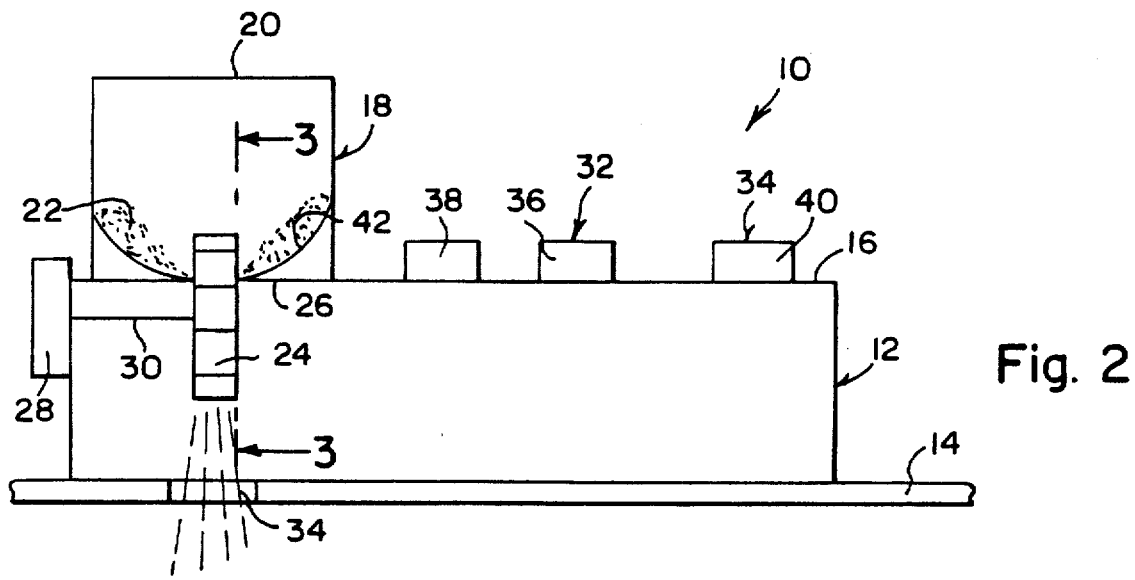
FIG. 2 is a diagrammatic front view showing the invention mounted on a fish tank light fixture.

Turning now descriptively to the drawings, in which similar reference characters denote similar elements throughout the several views, FIGS. 1 and 2 illustrates an automatic fish feeder 10 consisting of a housing 12 removably coupled to a fish tank light fixture 14. The housing 12 has a top support surface 16 in which a container 18 having an open top 20 for receiving fish food 22 therein is carried on the top support surface 16 of the housing 12. A sprocket 24 is rotatbly carried in the housing 12 so as to extend into bottom 26 of the container 18 to collect a portion of the fish food 22. An electric motor 28 has a shaft 30 coupled to the sprocket 24. Means 32 is carried on the top support surface 16 to operate the electric motor 28 at specific timed intervals so as to rotate the sproket 24 to deposit the fish food 22 through an aperture 34 in the housing 12 and the light fixture 14 into the fish tank to feed the fish.

The operating means 32 is an electric circuitry 34 which includes a transformer 36 connected to a remote power source, a relay 38 connected to the transformer 36 and a timer 40 connected between the relay 38 and the electric motor 28. The container 18 includes an inside curved bottom wall 42 so as to allow all the fish food 22 to move towards the sprocket 24 when the sprocket rotates.

Figure 3:
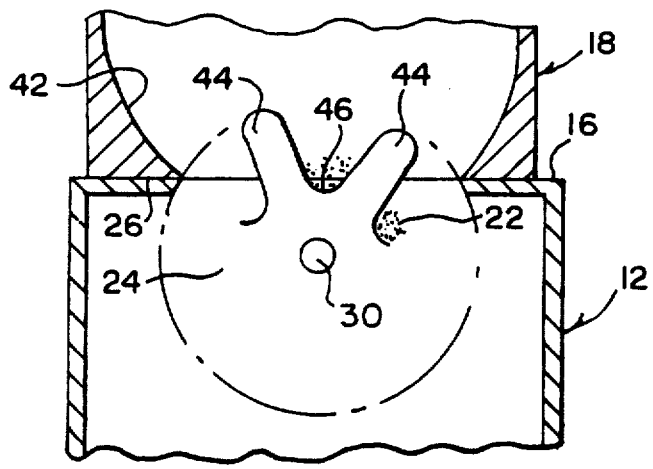
FIG. 3 is an enlarged plan view of the sprocket wheel taken along line 3—3 in FIG. 2, showing the bottom of the sprocket below the support surface so that the food will always fall down into the fish tank when the sprocket wheel rotates.

As shown in FIG. 3, the sprocket 24 includes a plurality of teeth 44 wherein bottom spaces 46 between the teeth 44 extend below the top support surface 16 of the housing 12 so that the fish food 22 will always fall down into the fish tank when the sprocket 24 rotates.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic fish feeder comprising the combination of:
    a) a housing removably coupled to a fish tank light fixture, said housing having a top support surface with an inlet and a feeding aperture beneath and aligned with said inlet through said housing and light fixture;
    b) a container having an open top for receiving fish food therein, said container carried on said top support surface of said housing and having a centered outlet aligned with said inlet;
    c) a sprocket rotatably mounted in said housing aligned with said outlet and inlet so as to extend into the bottom of said container to collect a portion of the fish food;
    d) an electric motor having a shaft coupled to said sprocket; and
    e) means carried on said top support surface to operate said electric motor at specific timed intervals so as to rotate said sprocket to deposit the fish food through said feeding aperture in said housing and the light fixture into the fish tank to feed the fish, said aperture being aligned with said sprocket and;
    f) means for causing food to enter sprocket at all levels of food in said housing, wherein said operating means is an electric circuitry which includes a transformer connected to a remote power source, a relay connected to said transformer and a timer connected between said relay and said electric motor; wherein said container includes an inside curved bottom wall so as to allow all the fish food to move towards said sprocket when said sprocket rotates and wherein said sprocket is centered relative to said container.

* * * * *